United States Patent [19]

Nortey

[11] Patent Number: 4,714,350

[45] Date of Patent: Dec. 22, 1987

[54] TWO-WING NON-INTERMESHING ROTORS OF INCREASED PERFORMANCE FOR USE IN INTERNAL BATCH MIXING MACHINES

[75] Inventor: Narku O. Nortey, Trumbull, Conn.

[73] Assignee: Farrel Corporation, Ansonia, Conn.

[21] Appl. No.: 925,319

[22] Filed: Oct. 31, 1986

[51] Int. Cl.⁴ .................. B29B 1/06; B01F 7/02
[52] U.S. Cl. .................................. 366/84; 366/300
[58] Field of Search ............... 366/84, 83, 85, 96, 366/97, 300, 297, 299, 301, 298; 425/207, 208

[56] References Cited

U.S. PATENT DOCUMENTS

| | | | |
|---|---|---|---|
| 3,610,585 | 10/1971 | MacLeod | 366/300 |
| 4,084,263 | 4/1978 | Millauer | 366/84 |
| 4,300,838 | 11/1981 | Sato | 366/84 |
| 4,456,381 | 6/1984 | Inoue | 366/300 |

*Primary Examiner*—Robert W. Jenkins
*Attorney, Agent, or Firm*—Parmelee, Bollinger & Bramblett

[57] ABSTRACT

Non-intermeshing two-wing rotors for use in high intensity mixing machines of the batch type provide new sequences and new characteristics of dynamic interactions for achieving advantageously increased mixing effectiveness, improved performance and productivity for such machines. These new rotors are adapted for driving at unequal speed (unsynchronized rotation) or at equal speed (synchronized rotation), and thus they are adapted for retrofitting into existing mixing machines. The optimum results are achieved by turning the two rotors at synchronous speed with a phase angle relationship of about 180° between rotors as shown by various well-known performance criteria. These criteria are plotted, and rating results are tabulated as compared with 0°, 90° and 135° phase angle relationships. By virtue of driving the rotors at synchronous speed with the phase angle relationship of about 180°, a powerful squeeze-flow mixing action and advantageous pull-down effect on the materials being mixed is produced twice during each cycle of rotation. The mixing chamber of the machine can be loaded with materials to be mixed at a higher "fill factor" than conventionally used. The ability to use a higher fill factor plus the marked decrease in rejected or unsatisfactory mixed batches achieves a significant increase in productivity with a given size of mixing chamber as compared with prior two-wing rotors.

11 Claims, 37 Drawing Figures

FIRST TWO WINGS APPROACH CENTER OF MIXER

↗ FLOW DIRECTION OF MATERIAL

YW: EXPERIENCES SQUEEZE-FLOW TYPE OF MIXING

ZY & WV: ALLOW TRANSVERSE EXTENSIVE MIXING AND THIS MIXING BEHAVIOUR IS INTENSIFIED BY THE SQUEEZING OF THE MIX OR THE RANDOMIZATION OF THE MIX AT BD.

YX & XW: EXPERIENCE SLIGHT TRANSVERSE EXTENSIVE MIXING.

SECTION B-B

SECOND TWO WINGS APPROACH CENTER OF MIXER

↗ FLOW DIRECTION OF MATERIAL
Y'W': EXPERIENCES SQUEEZE-FLOW TYPE OF MIXING
Z'Y' & W'V': ALLOW TRANSVERSE EXTENSIVE MIXING AND THIS MIXING BEHAVIOUR IS INTENSIFIED BY THE SQUEEZING OF THE MIX OR THE RANDOMIZATION OF THE MIX AT BD.
Y'X' & X'W': EXPERIENCE SLIGHT TRANSVERSE EXTENSIVE MIXING.

SECTION D-D

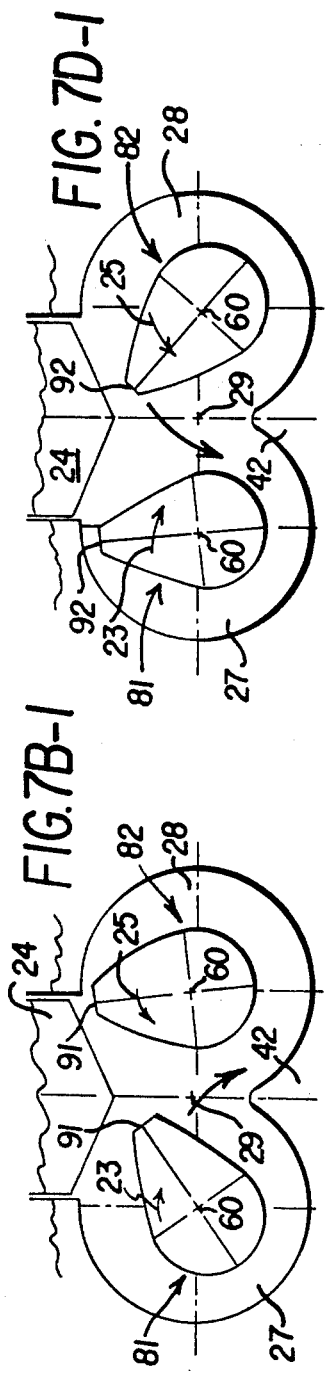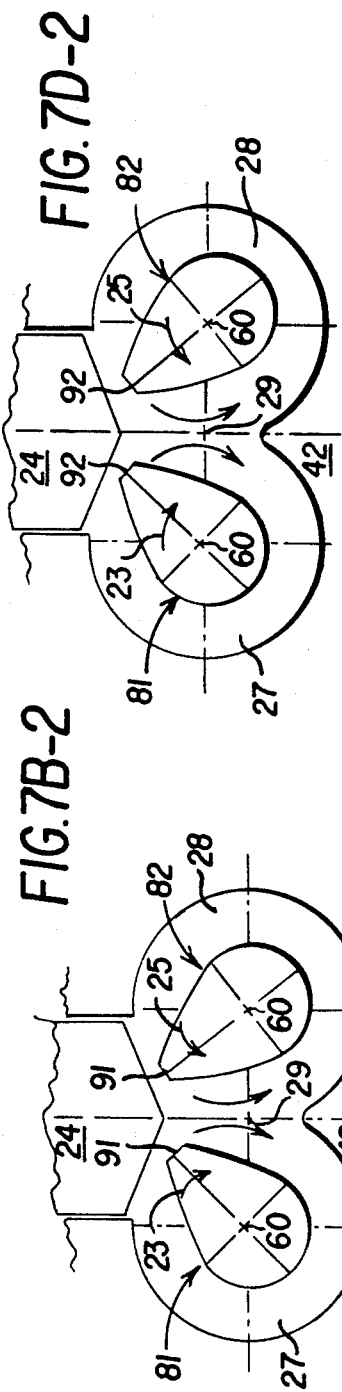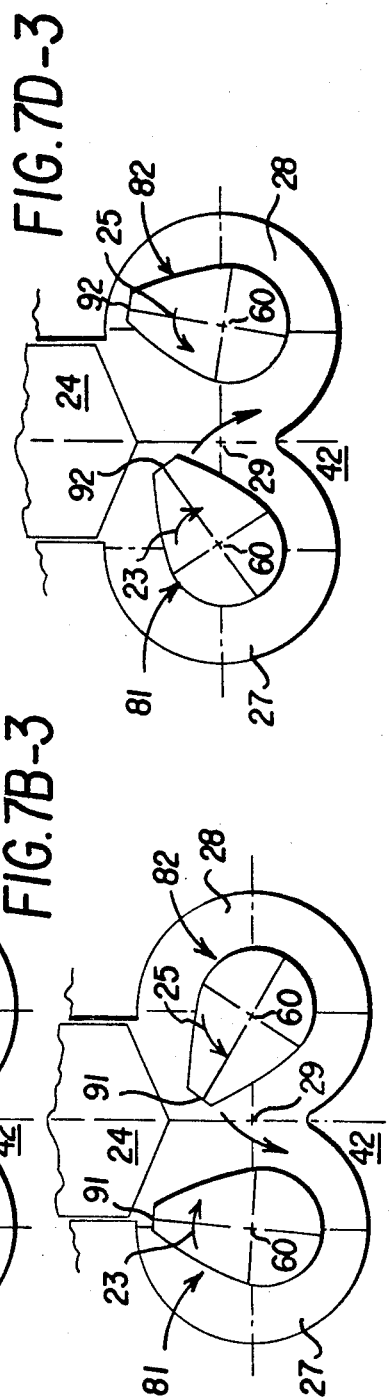

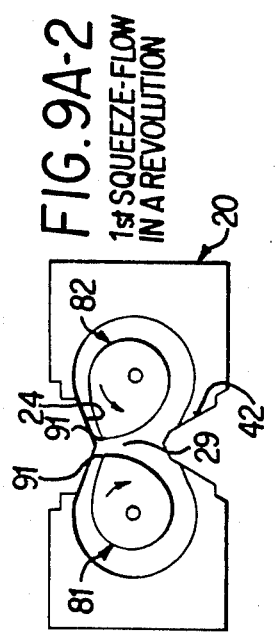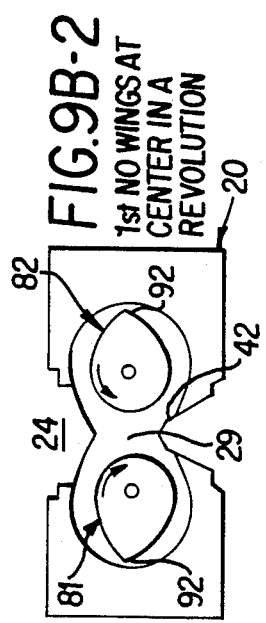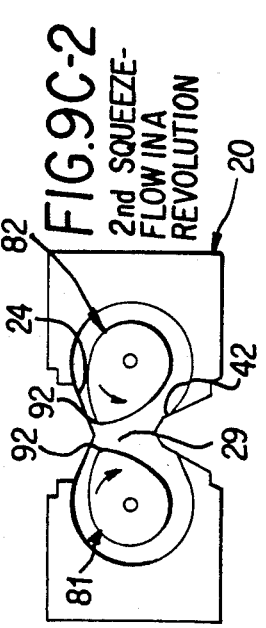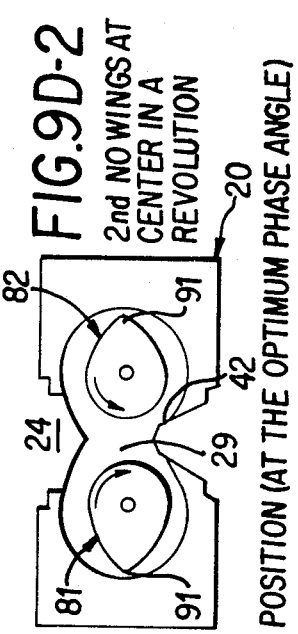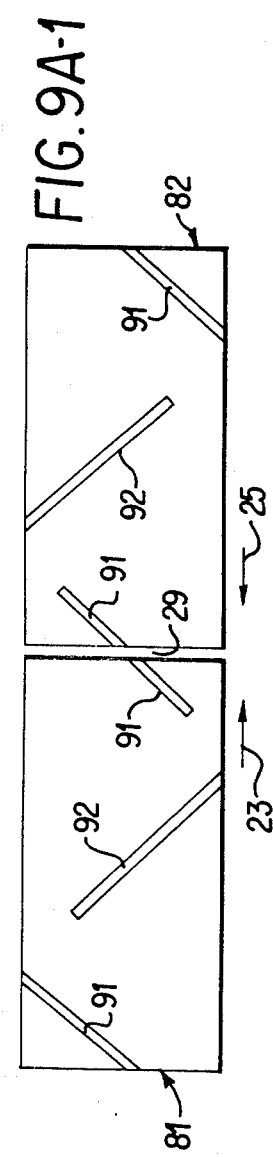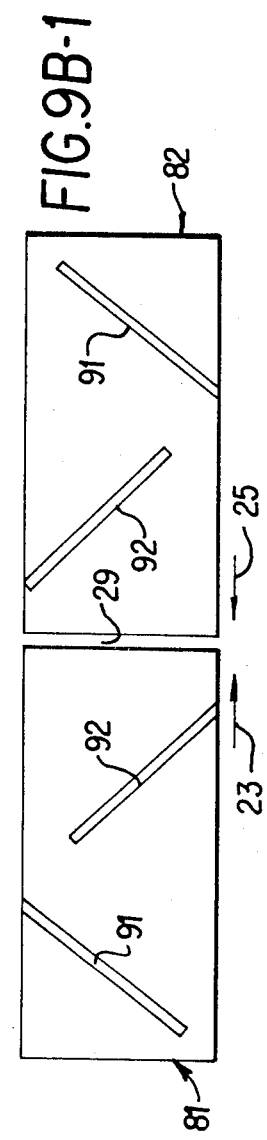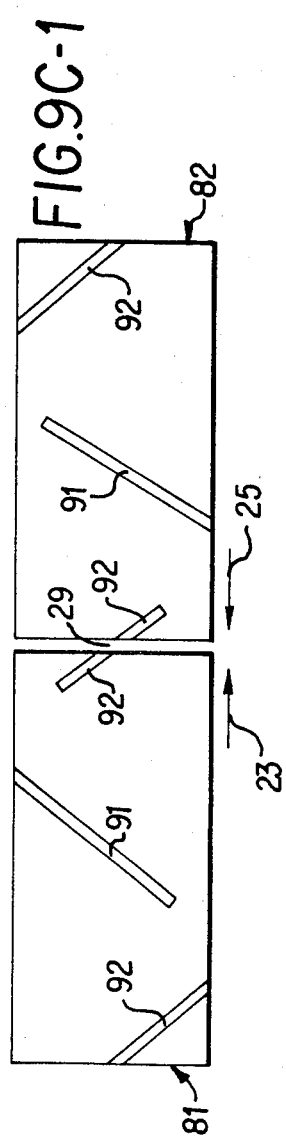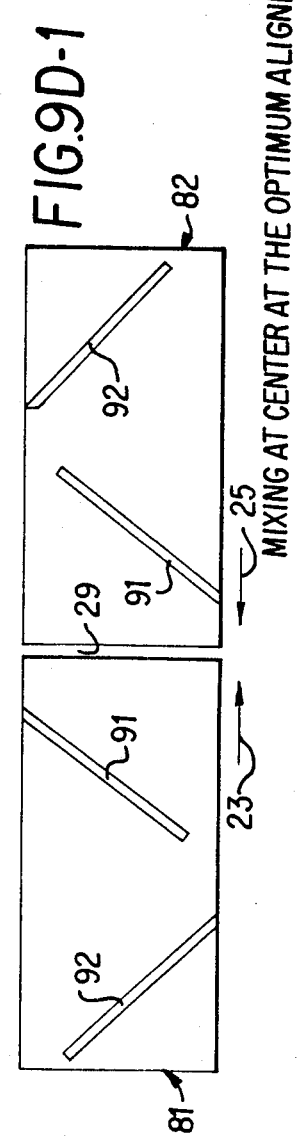

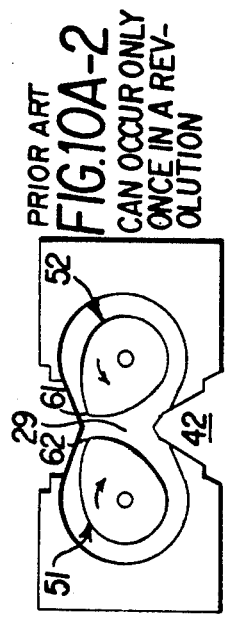
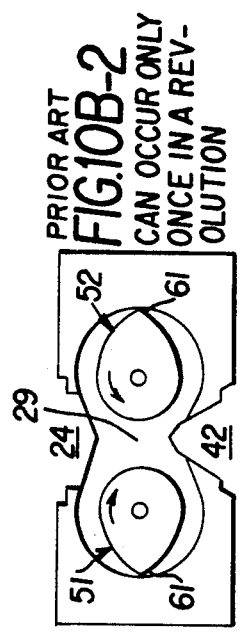
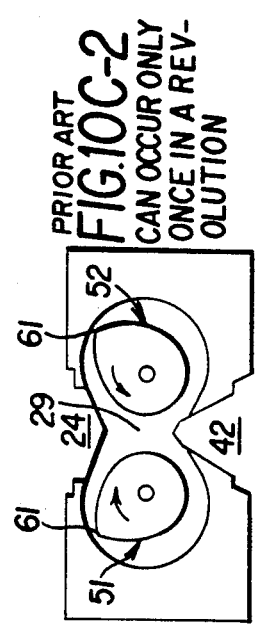
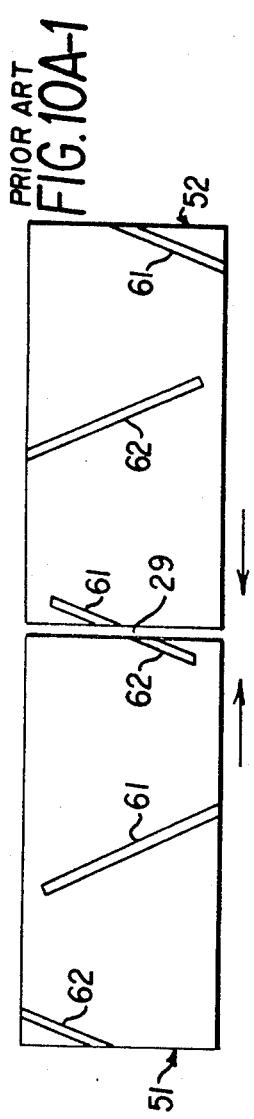
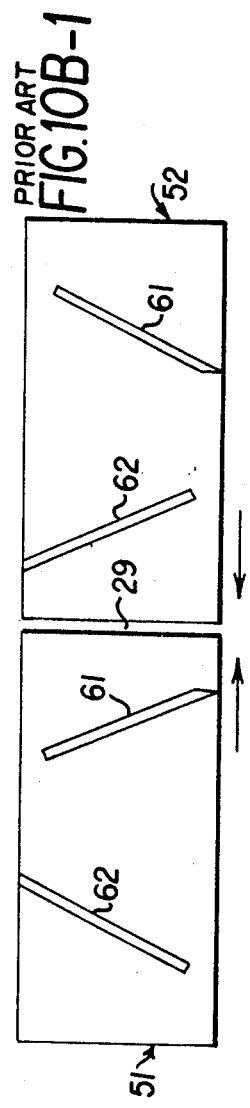
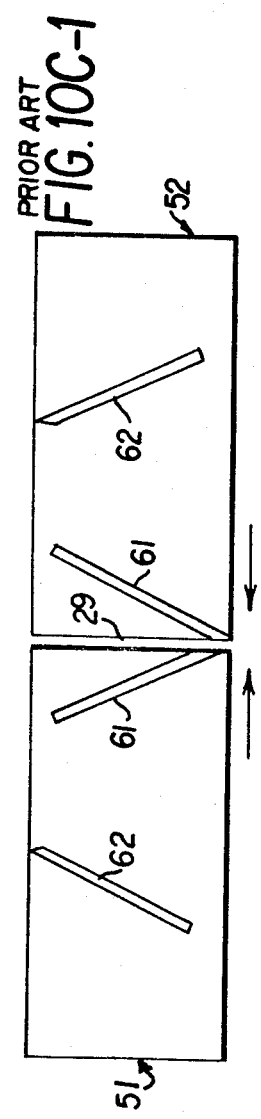
MIXING AT CENTER AT NON-SPECIFIED POSITION, i.e. AT NON-SPECIFIED PHASE ANGLE.
NOTE: POOR TRANSFER OF MATERIAL FROM CHAMBER 27, 28 TO CHAMBER 28, 27. THIS CONDITION WILL NOT BE EXPERIENCED BY THE NEW ROTORS AT THE OPTIMUM ALIGNED POSITION.

TWO-WING NON-INTERMESHING ROTORS OF INCREASED PERFORMANCE FOR USE IN INTERNAL BATCH MIXING MACHINES

BACKGROUND

This invention relates to high intensity internal mixing machines of the batch type having a mixing chamber shaped to accommodate two counter-rotating non-intermeshing winged rotors. The batch of ingredients to be mixed into a homogeneous mass is fed down into the mixing chamber through a vertical chute and is pushed down under pressure by a ram located in the chute. This ram is hydraulically or pneumatically driven. The lower face of the ram, when advanced down to its operating position during mixing of the batch, forms an upper portion of the mixing chamber. The homogeneous mixture produced is removed from the mixing chamber through a discharge opening at the bottom of the chamber, and a door associated with this opening is then closed in readiness for the next batch of ingredients to be introduced down through the chute.

Some internal batch mixing machines are designed with non-intermeshing rotors, and others have intermeshing rotors. Intermeshing rotors must always be driven at the same rotational speed in synchronized relationship; non-intermeshing rotors may be driven at the same rotational speed or at different rotational speeds for achieving different mixing and kneading effects. The present invention relates to the non-intermeshing type. The wings of the rotors have a generally helical configuration, and they produce high intensity mixing and homogenization by the cooperative interaction of their various forceful dynamic effects, as described later. For further information about such internal batch mixers, having non-intermeshing rotors, reference may be made to U.S. Pat. Nos. 1,200,700 and 3,610,585, assigned to predecessors of the present assignee; and the disclosures of these patents are incorporated herein by reference as background information.

The present invention improves the mixing performance and productivity of such high intensity internal batch-type mixing machines by providing a pair of two-wing, non-intermeshing rotors of novel configuration. In addition to the advantages resulting from their increased effectiveness, these two-wing rotors are adapted for operation under the conditions of high torque loading which will be encountered in high intensity internal batch mixing machines of enhanced performance for use with tougher rubber and plastics materials in the future.

SUMMARY OF THE DISCLOSURE

The general object of the present invention is to enhance the effectiveness, performance, productivity and uniformity of output of a pair of two-wing non-intermeshing rotors in such machines by providing new sequences and new characteristics of dynamic interactions between the counter-rotating rotors and to obtain such enhancements regardless of whether the two rotors are being turned (a) synchronized, i.e. at the same speed (equal speed) or (b) non-synchronized, i.e. at somewhat different speeds (non-equal speed), often called "friction ratio" speed.

Moreover, the general object of the invention includes achieving these advantages without considerably enlarging the volume and envelope configuration of these new rotors so that: (1) These novel two-wing rotors will fit into the mixing chambers of existing internal batch mixing machines without requiring modifications in such machines for enabling improved performance and productivity to be provided in existing machines by retrofitting with a pair of these new two-wing rotors; (2) These new rotors will not occupy much more volume than existing rotors for enabling the existing usable room in the mixing chamber ("the free volume") to remain available for handling substantially the same batch volume as previously; (3) These rotors are adapted for incorporation into new internal batch mixing machines wherein the mixing chamber volumes are similar to those of various sizes of such machines now in use, but wherein considerably increased power will be delivered to the new rotors for overcoming the higher forces to be generated by the tougher rubber and plastics materials to be mixed and homogenized in the future.

Among the objects of the present invention are to provide a pair of two-wing non-intermeshing rotors for use in internal batch mixing machines which will provide improved mixing performance, uniformity and productivity as compared with a pair of rotors as disclosed in U.S. Pat. No. 4,456,381—Inoue, et al. The Inoue, et al. patent discloses a pair of rotors each having two long wings originating from opposite ends of the rotor. These two long wings on each rotor have the same helix angle. The helix angle of the two long wings is in the range from 10° to 40°. The ratio of the axial length of these wings to the overall total axial length of the rotor ranges from 0.6 to 0.9. This range means that the wing overlap on each rotor is between 0.2 to 0.8 times the total length of the rotor. The twist (wrap) angle of each wing is in the range from 14° to 90.6° as seen in FIG. 10 of the Inoue, et al. patent. Since the helix angles of all wings in that patent are the same, there is small ability for a wing tip on one rotor to "wipe" past a wing tip on the other rotor at the interaction between the counter-rotating rotors at the center of the mixing chamber. This undesirable equal angle relationship therefore hinders transverse mixing at said center of interaction between the rotors, tending to result in poor uniformity of mixing.

Since the twist (wrap) angle of the Inoue, et al. rotor wing tips is only 90.6° or less, the wing tips will dwell at the center of the mixing chamber for a relatively short time, thereby permitting a relatively large volume of material to reside relatively stagnant near the center of the mixer for a major portion of a mixing cycle. This stagnant volume of material near the center of the machine experiences poor heat transfer and considerably less active mixing than other portions of the batch of material being mixed.

In accordance with the present invention in certain of its aspect there are provided a pair of non-intermeshing two-wing rotors for use in high intensity internal mixing machines of the batch type, as described in this specification. Each of these rotors has a driven end and a coolant end and two long wings having wing tips of generally helical configuration. These long wings originate from opposite ends of each rotor; that is, the leading ends of their wing tips are located at opposite ends of the rotor, and are oriented about the rotor axis at angular positions of 176° to 184° relative to each other. The wing tip of the first long wing on each rotor has a smaller helix angle ($A_1$) in the range from 25° to 40°. The wing tip of this first wing has a twist (wrap) angle in the range from 80° to 110°. Its axial length ratio, i.e. its axial length to the axial length of the rotor, is in the range from 0.6 to 0.85. This first wing is axially longer than the second long wing, now to be described.

The second long wing has a larger helix angle ($A_2$) in the range from 35° to 55°. Its twist (wrap) angle is in the range from 90° to 120°, and its axial length ratio is in the range from 0.35 to 0.75.

The difference in the helix angles of these two wings is in the range from 5° to 15°. This difference in helix angles advantageously causes a wing on one rotor to "wipe" a wing on the other rotor where they are near each other in the center of the mixing chamber. Thus, in marked distinction to the rotors disclosed in the Inoue, et al., U.S. Pat. No. 4,456,381, discussed above, the rotors of the present invention each has two long wings whose wing tips are oriented at different helix angles for providing a number of important advantages as will be explained later with reference to the drawings.

BRIEF DESCRIPTION OF THE DRAWINGS

The features, objects, aspects and advantages of the present invention will become more fully understood and appreciated from the following detailed description and the appended claims, considered in conjunction with the accompanying drawings which show by way of example a preferred embodiment of the present invention in contrast with rotor structures of the prior art. The same reference numbers and letters are used to indicate corresponding elements and features throughout the various views.

FIGS. 7B-1, 7B-2 and 7B-3 and FIGS. 7D-1, 7D-2 and 7D-3 are simplified elevational sectional views generally similar to FIGS. 7B and 7D for purposes of explanation, these section views being taken respectively along planes B-1, B-2 and B-3 in FIG. 7A and along planes D-1, D-2 and D-3 in FIG. 7D.

FIGS. 9A-1, 9B-1, 9C-1 and 9D-1 show the interrotor relationships between a pair of rotors embodying the invention in terms of the unwrapped envelopes of these rotors as the wings of the rotors approach the center of the mixing chamber.

FIGS. 9A-2, 9B-2, 9C-2 and 9D-2 are simplified elevational sectional views taken on vertical planes through the center of the mixer. In other words, these four elevational sectional views are similar in layout to FIGS. 7B and 7D. FIGS. 9A-2, 9B-2, 9C-2 and 9D-2 show the rotors in successive positions corresponding respectively to FIGS. 9A-1, 9B-1, 9C-1 and 9D-1.

FIGS. 9A-1 through 9D-2 all show the two rotors turning at equal speed and oriented at their optimum phase relationship one with respect to the other.

FIGS. 10A-1, 10B-1, 10C-1 show the interaction between two rotors as described in the above-referenced Inoue, et al. patent, with the rotors turning at unequal speed as described in that patent.

FIGS. 10A-2, 10B-2 and 10C-2 are elevational sectional views corresponding respectively to the respective rotor positions shown in FIGS. 10A-1, 10B-1 and 10C-1.

DETAILED DESCRIPTION

Figure 1:
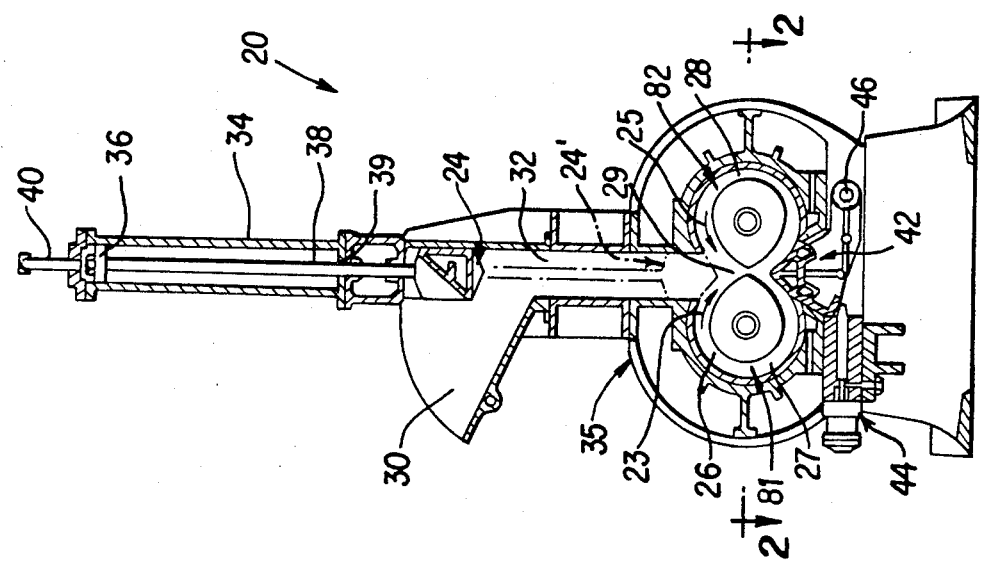
FIG. 1 is an end elevational view of an internal batch mixing machine of the non-intermeshing rotor type described embodying the present invention. Portions of the mixing machine in FIG. 1 are shown in section.

As shown in FIG. 1, a high intensity internal mixing machine of the batch type, generally indicated at 20, in which a pair of non-intermeshing rotors 81 and 82 embodying the present invention can be used to advantage, includes a vertically reciprocatable ram 24 movable between a raised position shown in FIG. 1 and a lowered operating position 24' shown in dashed outline. This ram 24 is used to move ingredients to be mixed down into a mixing chamber 26. In its operating position 24', it opposes the forces exerted by materials in the mixing chamber 26 as they are being thoroughly and intensely mixed by the wings to be described later on the two counter-rotating rotors 81 and 82, which are turned about spaced parallel horizontal axes, as shown by arrows 23 and 25. The left rotor 81 as seen in FIG. 1, is turned in a clockwise direction about its axis and the right rotor 82 in a counterclockwise direction. The mixing chamber 26 is shaped to accommodate these two rotors and includes left and right chamber cavities 27 and 28 each of generally circular cylindrical shape. These chamber cavities are positioned in horizontally opposed relationship open toward each other. There is a central region 29 of the mixing chamber 26 which is defined as being located generally between the two rotors 81 and 82.

The ingredients to be mixed are initially introduced into a hopper 30, while the ram 24 is raised, so that the ingredients can enter a chute 32 communicating with the hopper 30 and leading down into the central region 29 of the mixing chamber 26. Then the ram is lowered to push the ingredients down into the mixing chamber and to retain them therein. This ram 24 is shown being operated by a fluid-actuated drive cylinder 34, mounted at the top of the overall housing 35 of the mixing machine 20. The fluid cylinder 34, which may be hydraulic or pneumatic, contains a double-acting piston 36 with a piston rod 38 connected to the ram 24 for lowering and raising the ram. The ram is secured to the lower end of the piston rod 38 below the bottom end 39 of the cylinder 34. Actuating fluid under the desired pressure is fed through a supply line 40 into the upper portion of the cylinder 34 for urging the piston 36 downwardly to the lowered operating position 24′. After the mixing operation has been completed, the ram is retracted back to its raised position by actuating fluid fed into the cylinder 34 below the piston 36 through a supply line not seen in FIG. 1.

The mixed and homogenized materials are discharged from the bottom of the mixing chamber 26 through a discharge opening normally closed by a door 42 which is held in its closed position during mixing operation by a locking mechanism 44. The door 42 when released by the locking mechanism 44 is swung down around a hinge shaft 46. The door is swung, for example, by a pair of hydraulic torque motors, not shown, mounted on opposite ends of the hinge shaft 46.

Figure 2:
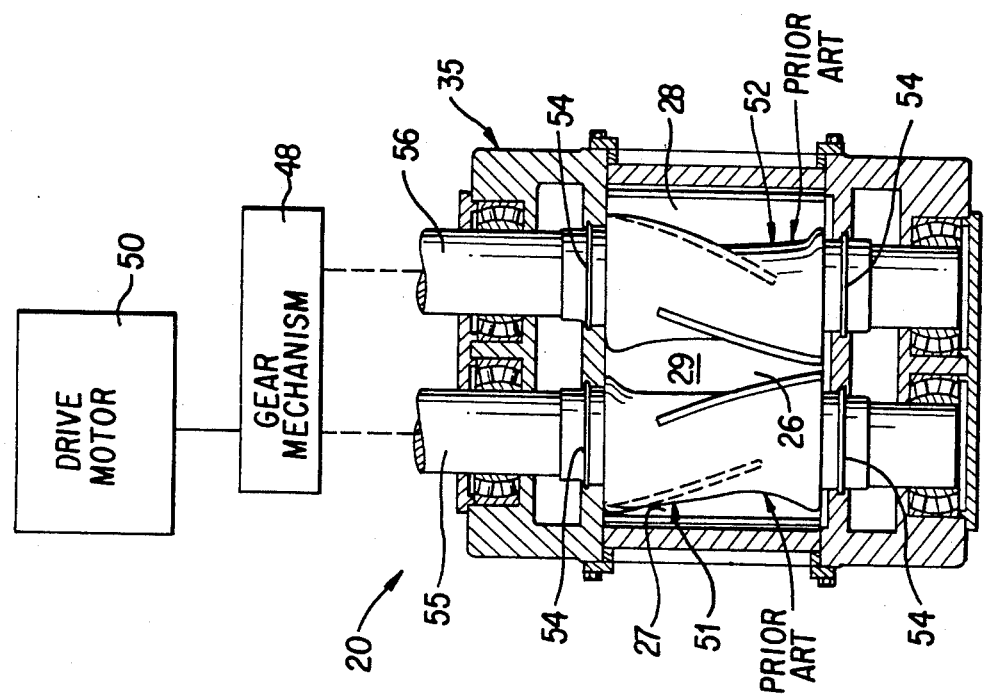
FIG. 2 is an enlarged plan sectional view taken along the line 2—2 in FIG. 1 through the mixing chamber, except that FIG. 2 is showing a pair of non-intermeshing, two-wing rotors of the prior art, wherein these two long wings both have the same helix angles.

FIG. 2 is a plan sectional view of the mixing mechanism 20 of FIG. 1 taken along the line 2—2, except that the two-wing rotors 51 and 52 which are illustrated are prior art rotors wherein the wing tips of the two relatively long wings both have the same helix angle as specified in the above-referenced Inoue, et al. patent. This FIG. 2 emphasizes that the novel rotors 81 and 82 can be installed in an existing mixing machine 20 for replacing conventional prior art rotors 51 and 52. These new rotors 81 and 82 can also be installed with advantage in a new mixing machine like the machine 20 as described.

As shown in FIG. 2, the rotors 51 and 52 or 81 and 82, as the case may be, are rotated in opposite directions 23, 25 by a conventional gear mechanism 48 which is driven by a drive motor 50. This gear mechanism 48 may comprise identical meshing gears for driving the rotors at the same, namely, synchronous speed. Alternatively, this gear mechanism may comprise meshing gears of somewhat different pitch diameters for driving the rotors at different speeds, for example at a speed ratio of 9 to 8, i.e. 1.125 to 1, called a friction gear ratio. The drive motor 50 may be of conventional configuration and preferably includes speed control means for varying the speed of rotation for the rotors, as desired, depending upon the particular ingredients in the mixing chamber 26 and their temperature and viscous state, and depending upon the desired rate of mixing power to be delivered by the rotors.

The optimum embodiment of the present invention in the inventor's opinion is to drive the pair of novel two-wing rotors at equal speed in a particular phase relationship to be described in detail further below.

There are conventional sealing collars 54 (FIG. 2) located immediately adjacent to each end of each rotor for sealing the mixing chamber 26. The ends of the rotors adjacent to the respective collars 54 are often called the "collar end", as will be shown in FIGS. 3 and 5.

Further detailed information concerning the construction of such a high intensity internal batch mixing machine 20 is set forth in the above-mentioned U.S. Pat. No. 3,610,585, incorporated herein by reference.

Figure 3:
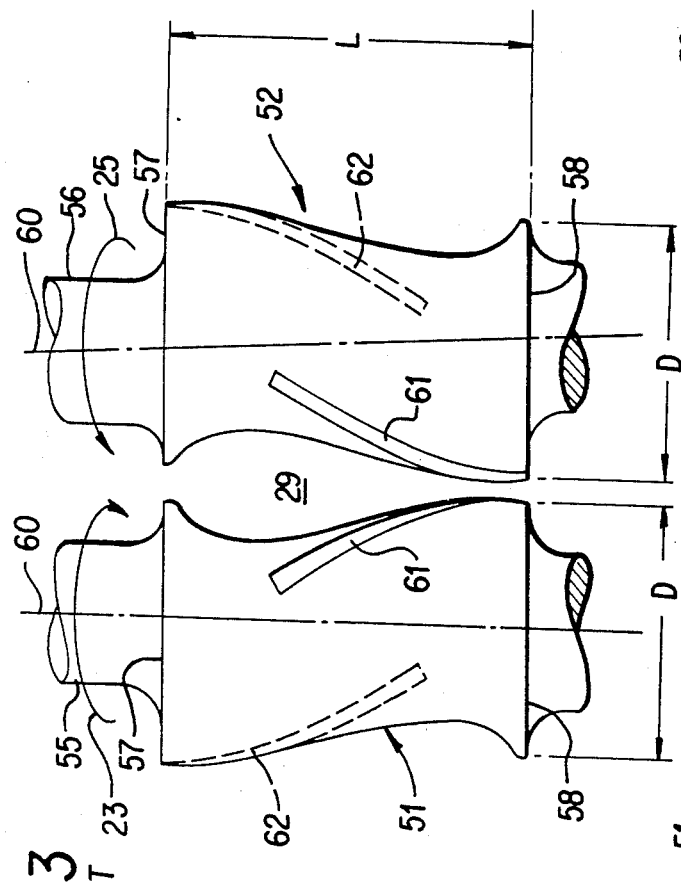
FIG. 3 is an enlarged plan view of the two prior art two-wing rotors shown in FIG. 2.
Figure 4:
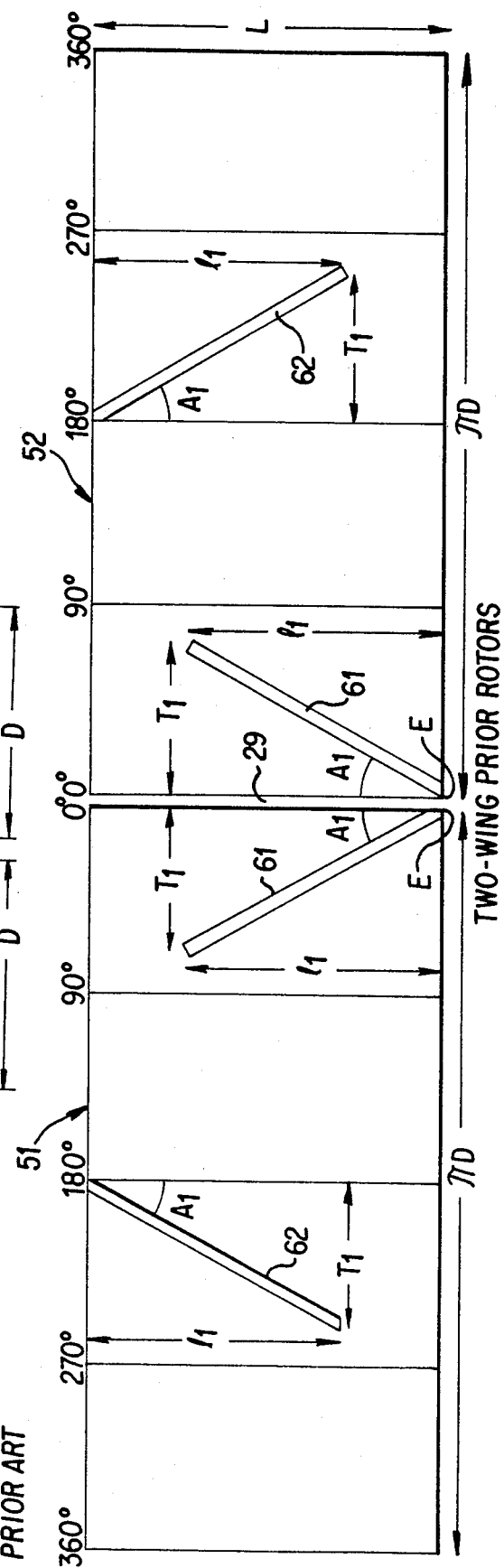
FIG. 4 shows the unwrapped envelopes of the two rotors of FIG. 3 illustrated the unwrapped helical wing tips of the rotor wings. When the rotor envelope is unwrapped, the helical wing tips appear as straight and diagonally oriented.

In FIG. 3, the left and right prior art rotors 51 and 52 are shown each having a length "L" measured between their respective collar ends 57 and 58. The collar end 57 connected to the drive shaft 55 or 56 is the "driven end" of the rotor, the other collar end 58 being the "coolant end" or "water end". The rotors contain collant passageways, and coolant (which is usually water) is fed into these passageways at the opposite ends from the location of the drive shafts 55 and 56. The rotor envelopes each has a diameter "D". Thus, the unwrapped length of each rotor envelope is "$\pi D$", as shown in FIG. 4.

A prior art rotor 51 and 52 has the wing tips of its two relatively long wings 61 and 62 both oriented at the same helix angle. These two wings 61 and 62 on each rotor originate from opposite collar ends. The term "originating from" or similar language signifies that the leading end of the respective helical wing tip 61 or 62 is located at the designated collar end. The rotor axis is indicated at 60, and the angular positions 0°, 90°, 180°, 270° and 360° of the unwrapped rotor envelope are angular positions about the rotor axis. The 0° or 360° angular position is defined for convenience of explanation with reference to FIGS. 3 and 4, as being that position on the rotor envelope adjacent to the central region 29 and lying on a horizontal plane containing the two rotor axes 60.

A summary of the parameters of the two-wing rotors 51 and 52, as specified by Inoue, et al., is set forth in Table I below:

TABLE I

| | (Prior art, FIGS. 3 & 4) | | | |
|---|---|---|---|---|
| | Originating Angular Position | Helix Angle A | Twist Angle *T | Ratio l/L |
| Long Wing 61 | 0° | 10° to 40° | 14° to 90.6° | 0.6 to 0.9 |
| Long Wing 62 | 180° | 10° to 40° | 14° to 90.6° | 0.6 to 0.9 |

*The Twist (Wrap) Angle range of values are derived from FIG. 10 of Inoue, et al. and do not appear in the text of that patent. Also, it is to be kept in mind that "twist angle" as used in the text of Inoue, et al. is synonymous with "helix angle" as used in the present specification. Inoue, et al. do not deal per se with the Twist (Wrap) Angle, and that is why it is necessary to derive the values thereof from their FIG. 10. For example, taking their value of 40° for θ, namely a helix angle of 40° in FIG. 10, which corresponds with a ratio value of 0.6 for the ratio of axial wing length "l" to total rotor length "L", the calculation of Twist (Wrap) Angle is as follows: From column 5, lines 26–27, it is seen that $C_2$ in equation (9), in col. 5, is set at approximately 0.5. Therefore, from equation (9), $L = 0.5\pi D = 1.57 D$. Consequently, their axial wing length in terms of D is equal to $0.6 \times 0.5\pi D$, which equals $0.3\pi D$. A helical wing having a helix angle of 40° and an axial length of $0.3\pi D$ has a Twist (Wrap) Angle T, which is calculated as follows:
T = (axial wing length "l" tan θ/circumference of rotor envelope) × 360° = ($0.3\pi D$ tan 40°/$\pi D$) × 360° = 0.3 tan 40° × 360° = 0.3 × 0.839 × 360° = 90.6°.
NOTES: The helix angle of both wings is the same. The ratio of l/L in the range of 0.6 to 0.9 causes the wing overlap to be between 0.2 and 0.8 times the total rotor length L.
It is to be noted that each of the rotors 51 and 52 has a total axial length L which approximately equals 1.57 times the diameter D of the rotor envelope as specified in column 5, lines 26–27, plus equation (9).

It is to be noted that the rotor diameter "D", which is used in FIGS. 3, 4, 5 and 6, is the major diameter of the rotor as measured from wing tip to wing tip.

Figure 5:
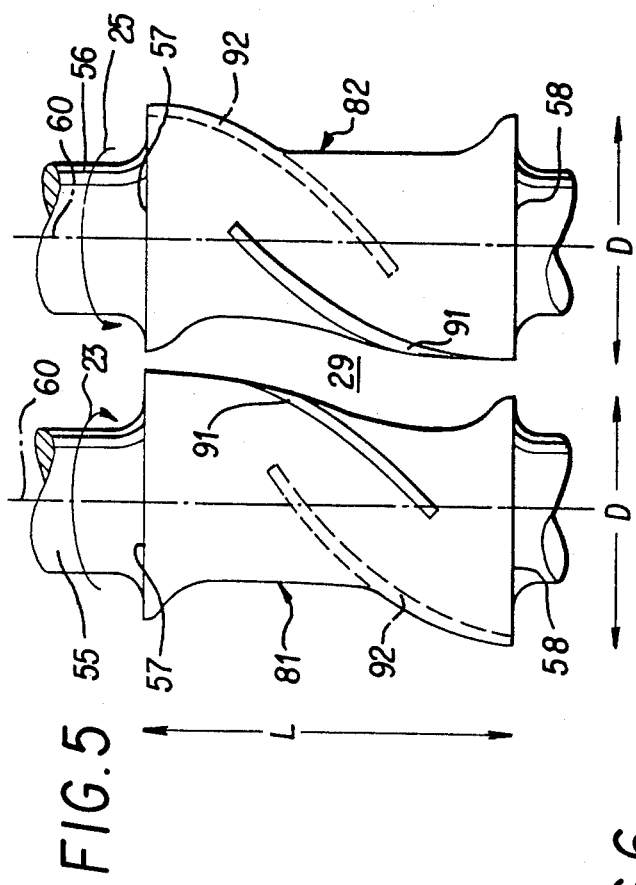
FIG. 5 is a plan view similar to FIG. 3, except that FIG. 5 shows a pair of two-wing rotors embodying the invention.
Figure 6:
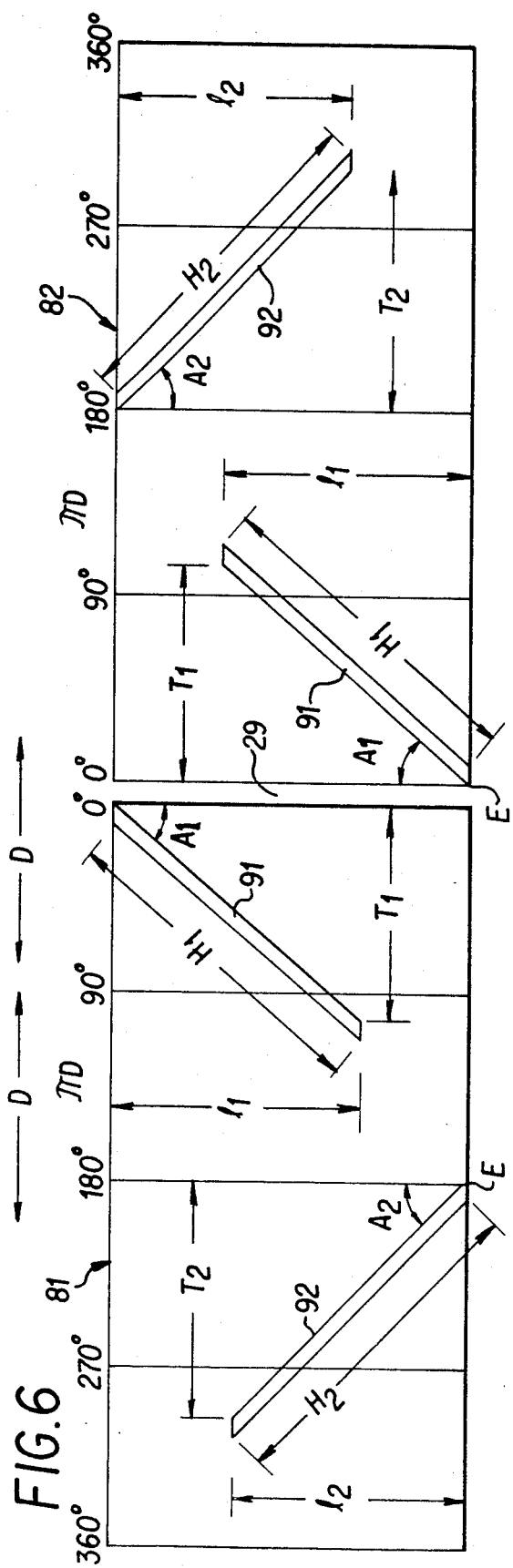
FIG. 6 shows the unwrapped envelopes of the rotors of FIG. 5.

The objects of the present invention are to overcome or in large measure to reduce the shortcomings of prior art non-intermeshing two-wing rotors and to enhance the effectiveness, mixing performance, uniformity of product mixing and productivity of two-wing rotors. Shown in FIGS. 5 and 6 are two-wing rotors 81 and 82 embodying the invention. The relatively long wings 91 and 92 on each rotor originate at opposite collar ends 57 and 58, and they are angularly positioned in the range 176° to 184° apart at their originating ends. The wing tip 91 of the first wing is oriented at a helix angle $A_1$ in the range from 25° to 40°, and has a twist angle $T_1$ in the range from 80° to 110°. Its axial length ratio, i.e. the ratio of its axial length "l" to the axial length "L" of the rotor, is in the range from 0.6 to 0.85. The wing tip 92 of the second wing is oriented at a larger helix angle $A_2$ in the range from 35° to 55°, and has a twist angle $T_2$ in the range from 90° to 120°. The difference between the helix angles $A_1$ and $A_2$ is in the range from 5° to 15°, thereby advantageously producing the "wiping" action as the wings of the opposed rotors pass each other near the center of the mixing chamber. $H_1$ and $H_2$ are the helical lengths of the respective rotor wings 91 and 92. $H_1$ equals $l_1/\cos A_1$, and $H_2$ equals $l_2/\cos A_2$.

TABLE II

| | FIGS. 5 & 6 (L = 1.58D) | | | |
|---|---|---|---|---|
| | Originating Angular Position | Helix Angle A | Twist Angle T | Ratio l/L |
| Long Wing 91 | 0° | 25° to 40° | 80° to 110° | 0.6 to 0.85 |
| Long Wing 92 | 176° to 184° | 35° to 55° | 90° to 120° | 0.35 to 0.75 |

NOTE:
The difference between helix angles $A_2$ and $A_1$ is in the range from 5° to 15°.

The Table below sets forth one preferred example of a set of design parameters for a pair of rotors 81 and 82 as shown in FIGS. 5 and 6:

TABLE III

| | Example of FIGS. 5 & 6 (L = 1.58D) | | | |
|---|---|---|---|---|
| | Originating Angular Position | Helix Angle A | Twist Angle T | Ratio l/L |
| Long Wing 91 | 0° | $A_1 = 39°$ | $T_1 = 106°$ | 0.71 |
| Long Wing 92 | 180° | $A_2 = 46°$ | $T_2 = 120°$ | 0.63 |

NOTE:
$A_2 - A_1 = 7°$

The advantageous cooperative mixing actions which are produced by the rotor wings 91 and 92 in the two chamber cavities 27 and 28 of the mixing chamber 26 are shown in FIGS. 7A, 7B, 7C, 7D, 7B-1, 7B-2, 7B-3, 7D-1, 7D-2 and 7D-3. The phase relationship between the rotors as shown in these FIGS. 7 is the optimum relationship of about 180°. Phase relationship is defined in practical terms for the technician in the field who is setting the orientation of the two rotors using the index mark at "E" (FIGS. 4 and 6) on the originating end of the wing originating at the coolant end 58 of the rotor. Thus, FIGS. 3 and 4 show a zero phase angle relationship between the rotors 51 and 52; whereas, FIGS. 5 and 6 show a 180° phase angle relationship between the rotors 81 and 82. In FIG. 6, if the rotor 82 is held stationary in its present position, and if the rotor 81 were turned clockwise so as to position the index mark E of wing 92 on the 90° line, then the phase angle relationship would be 90°.

Figure 7A:
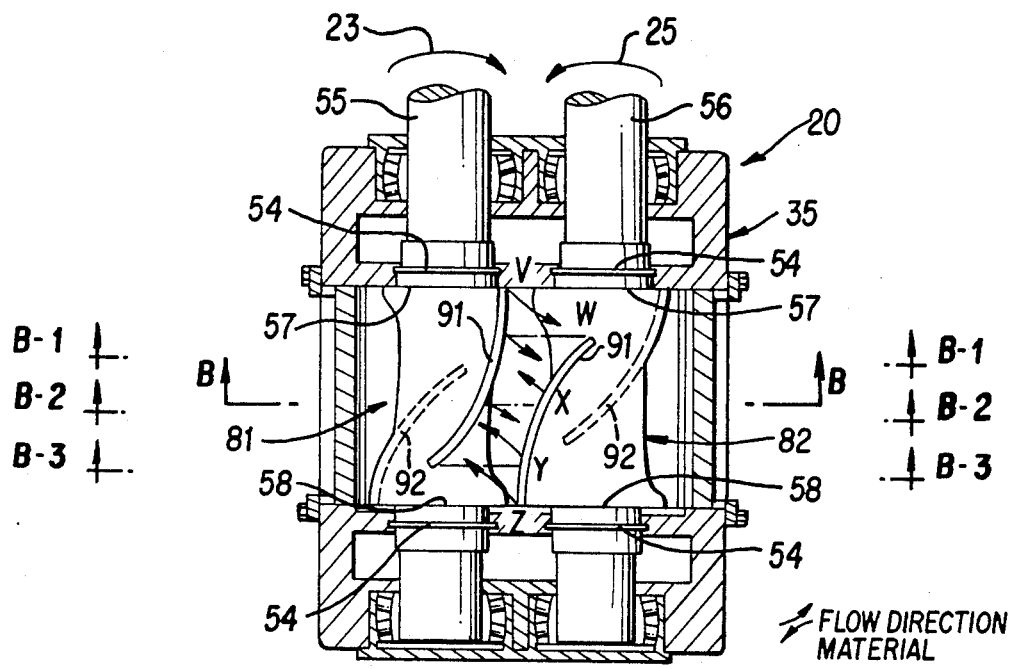
FIGS. 7A and 7C are plan sectional views taken along the plane 2—2 in FIG. 1 through the mixing chamber showing the advantageous interacton of the two rotors embodying the invention in mixing material.
Figure 7B:
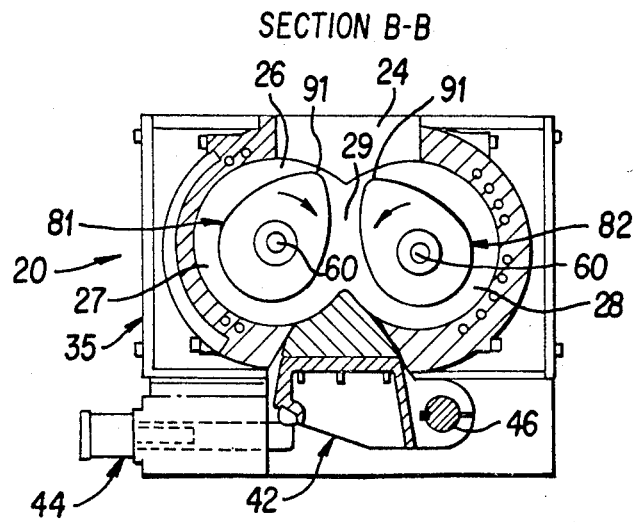
FIGS. 7B and 7D are elevational sectional views taken on the planes B—B and D—D, respectively, through FIGS. 7A and 7C.

FIGS. 7A and 7B show the dynamic actions occurring as the first wings 91 on each rotor are approaching the central region 29 of the mixing chamber 26 in their 180° phase relationship. The arrows indicate the flow direction of the materials being mixed. In the region from the dashed line Y over to the dashed line W, the materials experience a squeeze-flow type of mixing. This squeeze-flow action will be particularly appreciated from FIG. 7B showing the approaching first wing tips 91 on the two rotors. Also, FIG. 7B-2 is similar to FIG. 7B and illustrates the squeeze-flow dynamic action of the approaching rotor wings 91 on the materials in the mixing chamber between the two counter-rotating rotors.

In the region between the dashed lines W and V in FIG. 7A, there is transverse extensive mixing occurring as the driven collar end portion of the first wing 91 of the first rotor 81 is pushing downwardly and inwardly (Please also see FIG. 7B-1 which illustrates the region WV in FIG. 7A.) on the materials, thereby transferring materials from the left chamber cavity 27 over into the right chamber cavity 28, while also pushing and rolling the material diagonally in an axial direction. This driven collar end of the wing 91 of the first rotor 81 is not significantly opposed in the region WV, because the trailing end portion of the wing 91 of the second rotor 81 is momentarily located at the top of the first rotor.

In the region between the dashed lines Z and Y in FIG. 7A, the same types of transverse extensive mixing actions are occurring as in the region WV, but they are occurring in the opposite sense, as is shown in FIG. 7B-3, which illustrates the region ZY in FIG. 7A.

Also, it is to be noted that in the region between the dashed lines Y and X some transverse extensive mixing is occurring. And in the region between the dashed lines X and W some transverse extensive mixing is also produced in the opposite sense from that produced in region YX.

It will be appreciated from three FIGS. 7B-1, 7B-2 and 7B-3 that a tremendous "pull-down" is being exerted on the materials for pulling them down away from below the ram 24 and for pulling them down from the central region 29. There is very little opportunity for materials to remain sitting and stagnant in the central portion 29 of the mixing chamber.

Figure 7C:
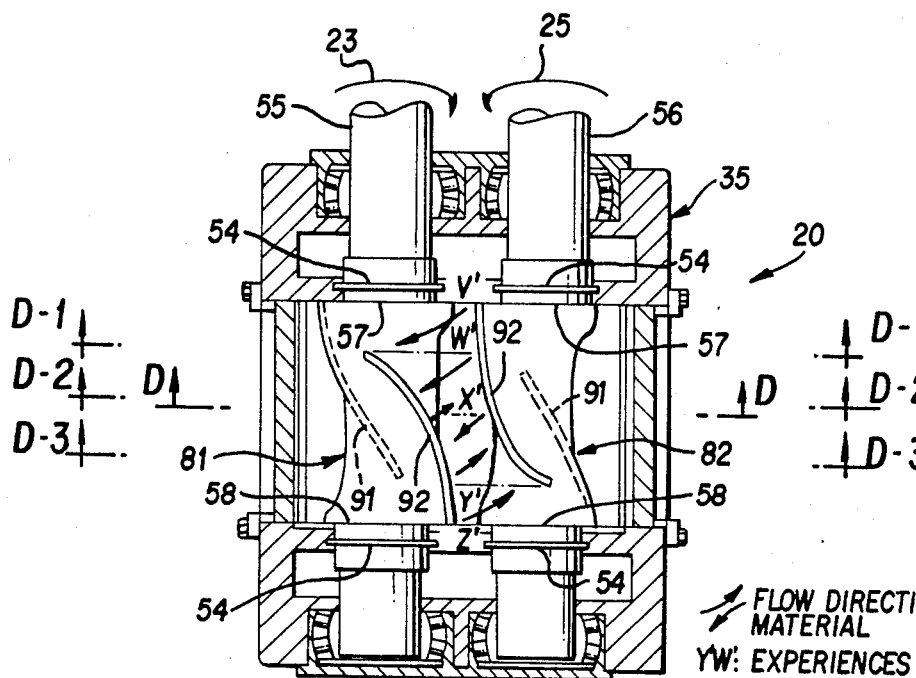
Figure 7D:
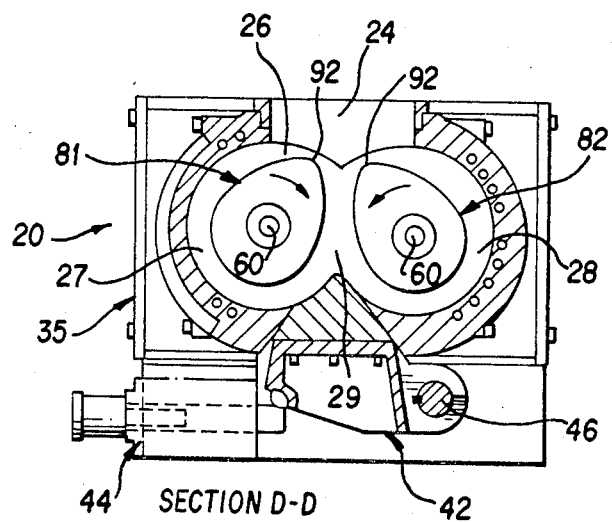

FIGS. 7C and 7D show the dynamic actions produced as the second wings 92 on each rotor are approaching the central region 29 of the mixing chamber, with the rotors oriented at a phase relationship of about 180°. The arrows indicate the flow directions of the materials undergoing mixing. In the region from the dashed line Y' over to the dashed line W' the materials are being subjected to a squeeze-flow type of mixing in the opposite sense from the actions shown in FIG. 7A. FIG. 7D illustrates the approaching second wing tips 92 on the two rotors. FIG. 7D-2 is similar to FIG. 7D and shows the squeeze-flow dynamic action of the approaching second rotor wings 92 acting on the materials in the central mixing chamber region 29. By virtue of the fact that the helix angle $A_2$ of the second wings 92 is consider-larger than the helix angle $A_1$ of the first wings 91, there is a larger component of axial force being exerted on the materials for flowing them more obliquely than by the first wings 91 in FIG. 7A and thereby randomizing the mixing action much more thoroughly than with the prior art rotors 51, 52 having equal helix angles $A_1$ and $A_2$.

In the region between the dashed lines W' and V' in FIG. 7C, there is transverse extensive mixing produced by the driven collar end portion of the second wing 92 of the second rotor 82 pushing downwardly and inwardly on the materials and also transferring materials from the right chamber cavity 28 over into the left chamber cavity 27, while also pushing and rolling the materials diagonally with an axial component of thrust. FIG. 7D-1 illustrates the region W'V' in FIG. 7C for clearly showing the dynamic actions taking place. This driven collar end portion of the second wing 92 of the second rotor 82 is not significantly opposed in the region W'V', because the trailing end portion of the second wing 92 of the first rotor 81 is momentarily positioned at the top of this first rotor.

In the region between the dashed lines Z' and Y' in FIG. 7C, the same types of transverse extensive mixing actions are produced as in the region W'V', but they are produced in the opposite sense as is clearly shown in FIG. 7D-3 which illustrates this region Z'Y' in FIG. 7C.

Also, it is to be noted that in the half region between the dashed lines Y' and X' some transverse extensive mixing is produced. And, in the other half region between the dashed lines X' and W' some transverse extensive mixing is also produced in the opposite sense from the actions in the half region Y'X'.

Again, it will be clearly seen from the three FIGS. 7D-1, 7D-2 and 7D-3, that another tremendous "pull-down" is being exerted on the materials beneath the ram 24 and near the central mixing chamber location 29. Materials are not allowed to sit stagnant near the central region 29 nor beneath the ram 24.

Therefore, these FIGS. 7 show that twice during each synchronized rotation of these novel rotors in 180° phase relationship, there are produced two powerful squeeze-flow actions and two tremendous "pull-down" effects. That is, these advantageous desirable forceful mixing sequences are produced twice during each cycle of synchronized revolution.

The reader is requested to take into account that final mixes of materials are sometimes mixed in a machine 20 for a total time period of only 45 seconds, because curatives or vulcanizing agents are often present. The desire is to have the materials fully discharged from the mixing chamber before any significant curing or vulcanizing has commenced as a result of the heating involved in the mixing work operation. Considering that the rotors may be turning at about 32 RPM, there are a total of only 24 rotations taking place for each rotor. The optimum 180° phase relationship, as discussed, enables the above-described advantageous forceful mixing sequences to occur twice during each cycle of rotation, thereby achieving the cumulative effect of twenty-four rotations times two forceful mixing sequences for a total of forty-eight such sequences.

Inoue, et al. are not directing any attention to the interaction, as described. Assuming that their rotors are turning at a friction ratio speed of 8 to 9, then the opposed wings will be approaching each other only about once or twice during every eight full cycles of rotation of the slower-turning rotor.

Figure 8A:
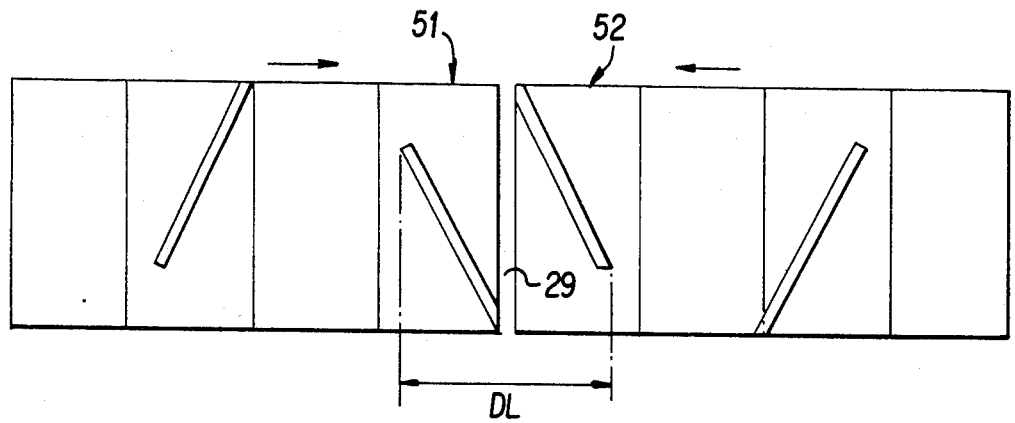
FIG. 8A illustrates the dwell time "DL" at the center 29 of the mixing chamber of the wings of a pair of prior art art rotors as shown in FIGS. 3 and 4.
Figure 8B:
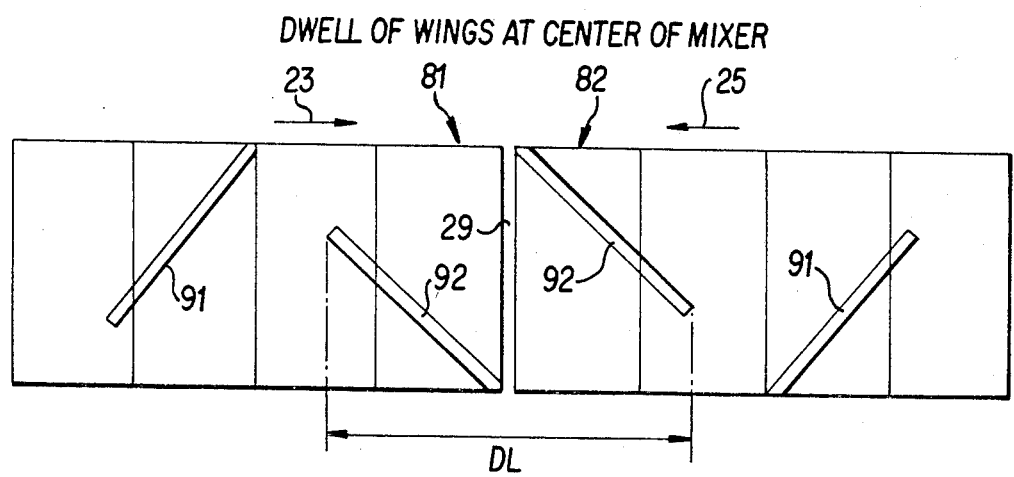
FIG. 8B illustrates the much longer dwell time "DL" at the center of the mixing chamber of the wings of a pair of rotors embodying the invention, as shown in FIGS. 5 and 6.

FIG. 8B shows that the wing tips of the opposed rotors have a total dwell time "DL" in the center region 29 which is much longer than the dwell time "DL" (FIG. 8A) of the Inoue, et al. wings. Therefore, once again it is seen that materials cannot sit stagnant in the central region 29 when using rotors in accordance with the present invention for the wing tips present there displace and pull-down and sweep away the materials which happen to reach the center region 29 at any time during a mixing operation.

FIGS. 9A-1, 9B-1, 9C-1 and 9D-1 show a sequence of positions of the unwrapped rotor envelopes of the two rotors 81, 82 in their optimum phase relationship of about 180° as the rotors are turning synchronously. FIGS. 9A-2, 9B-2, 9C-2 and 9D-2 are simplified elevational sectional views corresponding with the above respective positions of the rotor envelopes. These sequences of views are for the purpose of further emphasizing that the advantageous powerful mixing effects, as described in connection with FIGS. 7, are produced twice during each cycle of rotation.

FIGS. 10A-1, 10B-1 and 10C-1 show a sequence of positions of the unwrapped rotor envelopes of the Inoue, et al. rotors with the rotors being in non-specified phase relationship. FIGS. 10A-2, 10B-2 and 10C-2 correspond with the respective rotor envelope positions and show desirable orientations of the rotor wings 61 and 62 which can occur only once during each cycle of revolution.

In order to emphasize the importance of the optimum phase relationship upon performance, attention is now invited to the following Table IV which sets forth the ratings of seven criteria for judging performance of a mixing machine as a function of phase angle relationship. A rating scale of 1 to 4 is used, in which 4 is best:

TABLE IV

Rating* of Seven Different Performance Criteria as a Function of Phase Angle Relationship for the Rotor of FIGS. 5 and 6:

| | Phase Angle | | | |
|---|---|---|---|---|
| | 0° | 90° | 135° | 180° |
| Productivity | 3 | 1 | 2 | 4 |
| Mooney Reduction | 1 | 3 | 4 | 2 |
| Standard Deviation | 3 | 2 | 1 | 4 |
| Rheom. Torque | 3 | 2 | 1 | 4 |
| Standard Deviation | 2 | 1 | 3 | 4 |
| Batch Temperature | 3 | 1 | 2 | 4 |
| Standard Deviation | | | | |
| Specific Energy | 4 | 1 | 3 | 2 |
| TOTAL | 18 | 10 | 18 | 24 |

*Scale 1 to 4 (4 being best)

The Mooney Viscosity Reduction test procedure determines how much the viscosity of the material has been reduced by mixing and how much deviation is present between samples taken from various areas of a mixed batch, the more torque reduction and the less deviation, the better the respective ratings.

The Rheometric Torque test procedure determines how uniformly the curing or vulvanizing agent has been distributed throughout the batch. An oscillating torque test is carried out as the sample is curing or vulcanizing. The more uniform distribution of the agent, the better the rating.

Batch Temperature Standard Deviation involves a temperature probe sampling of various localized regions throughout a mixed batch. The various localized regions should all have the same temperature, thereby showing that essentially the same amount of mixing energy has been exerted on each localized volume of the total mix batch. The less deviation in temperature of the various samples, the better. The specific energy is a determination of how many Kilowatt Hours of electrical energy were delivered to the drive motor 50 in order to produce the completely mixed batch. Due to the powerful, desirable mixing sequences occurring twice during each rotation cycle considerable energy is consumed to complete mixing of the batch. Nevertheless, the specific energy rating is still better than that for the least effective 90° phase relationship.

Figure 11:
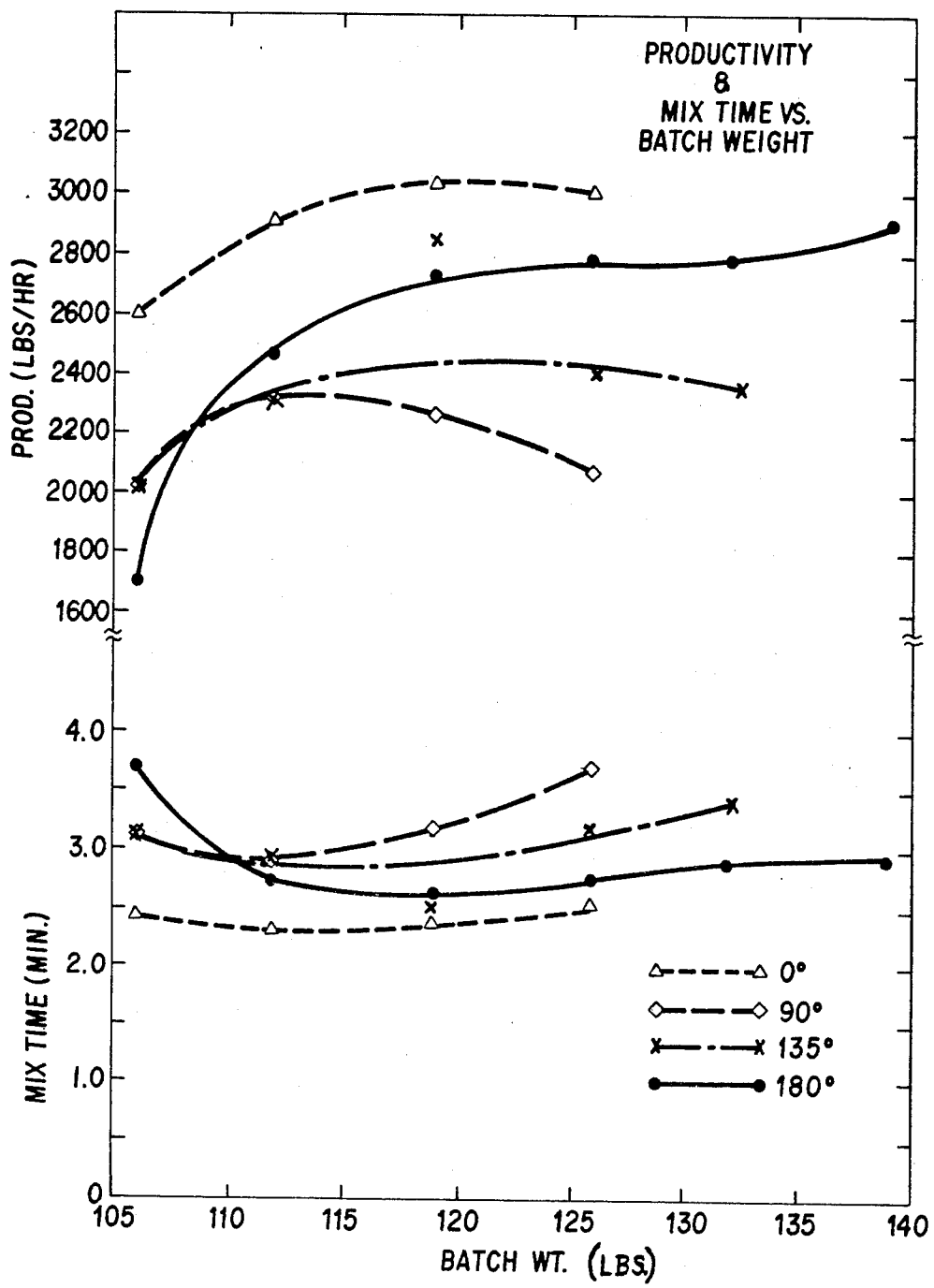
FIGS. 11, 12, 13, 14 and 15 are plots of various mixing performance criteria showing dramatically the effects of various phase angle relationships between the rotors when they are turning at equal (synchronous) speed and showing why a phase angle relationship (as defined later on) of about 180° is optimum.

FIG. 11 shows plots of Productivity and Mixing Time versus batch weight for the four different phase angle relationships 0°, 90°, 135° and 180° shown in Table IV as a function of Batch Weight.

Figure 12:
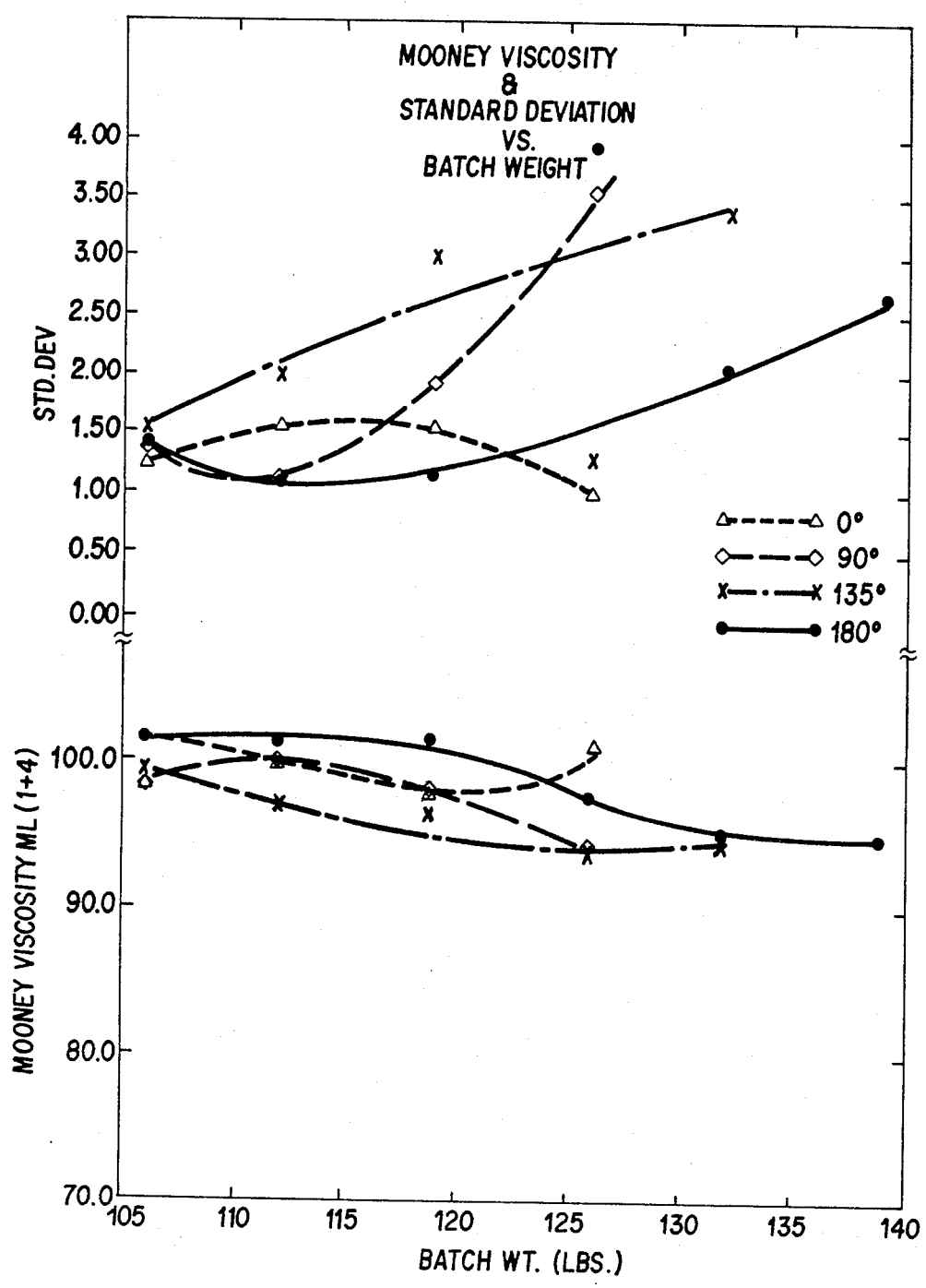

FIG. 12 shows plots of Mooney Reduction and Standard Deviation for these four phase angle relationships plotted as a function of batch weight.

Figure 13:
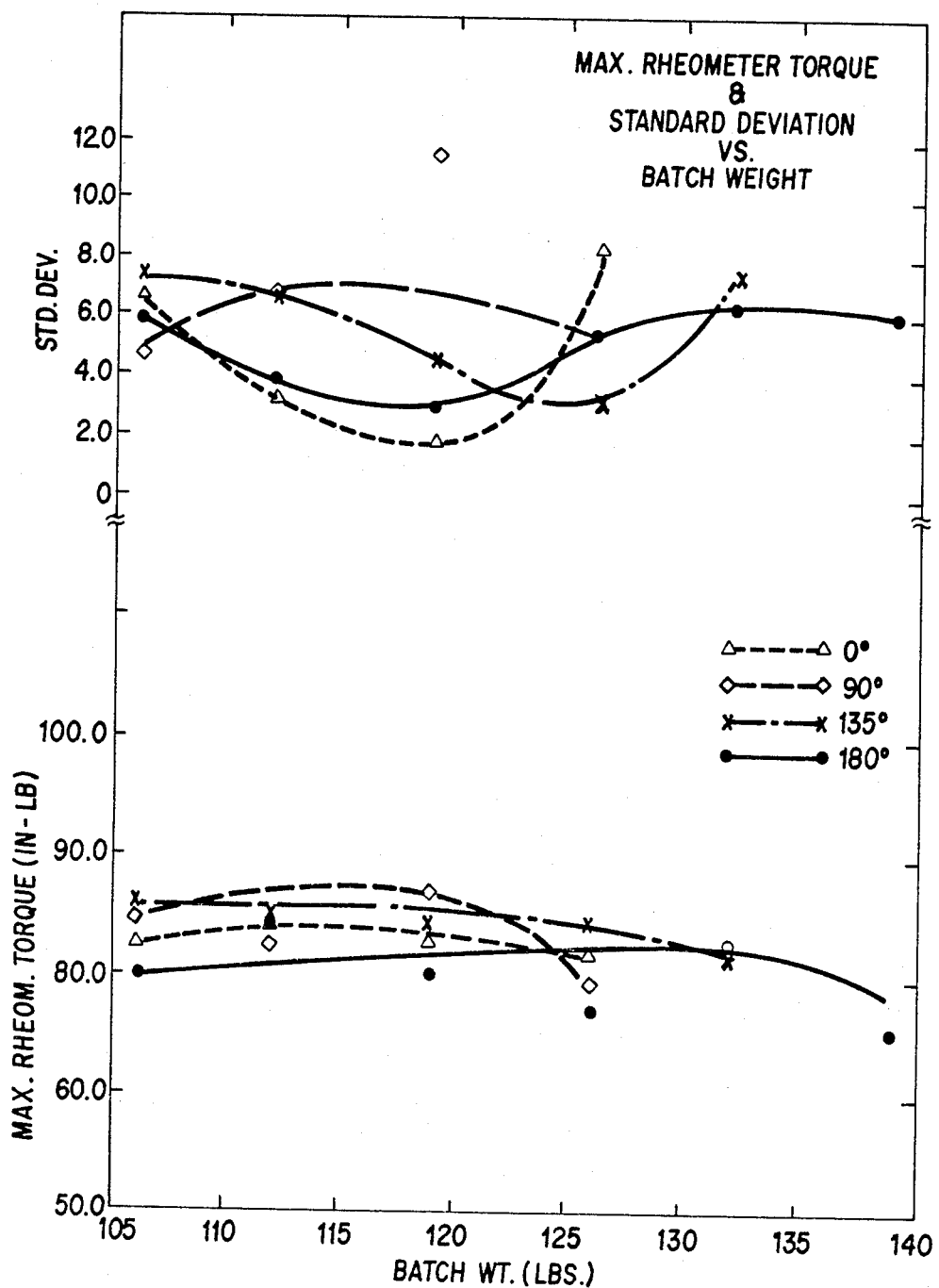

FIG. 13 presents plots of Maximum Rheometer Torque and Standard Deviation for these four phase angle relationships plotted as a function of batch weight.

Figure 14:
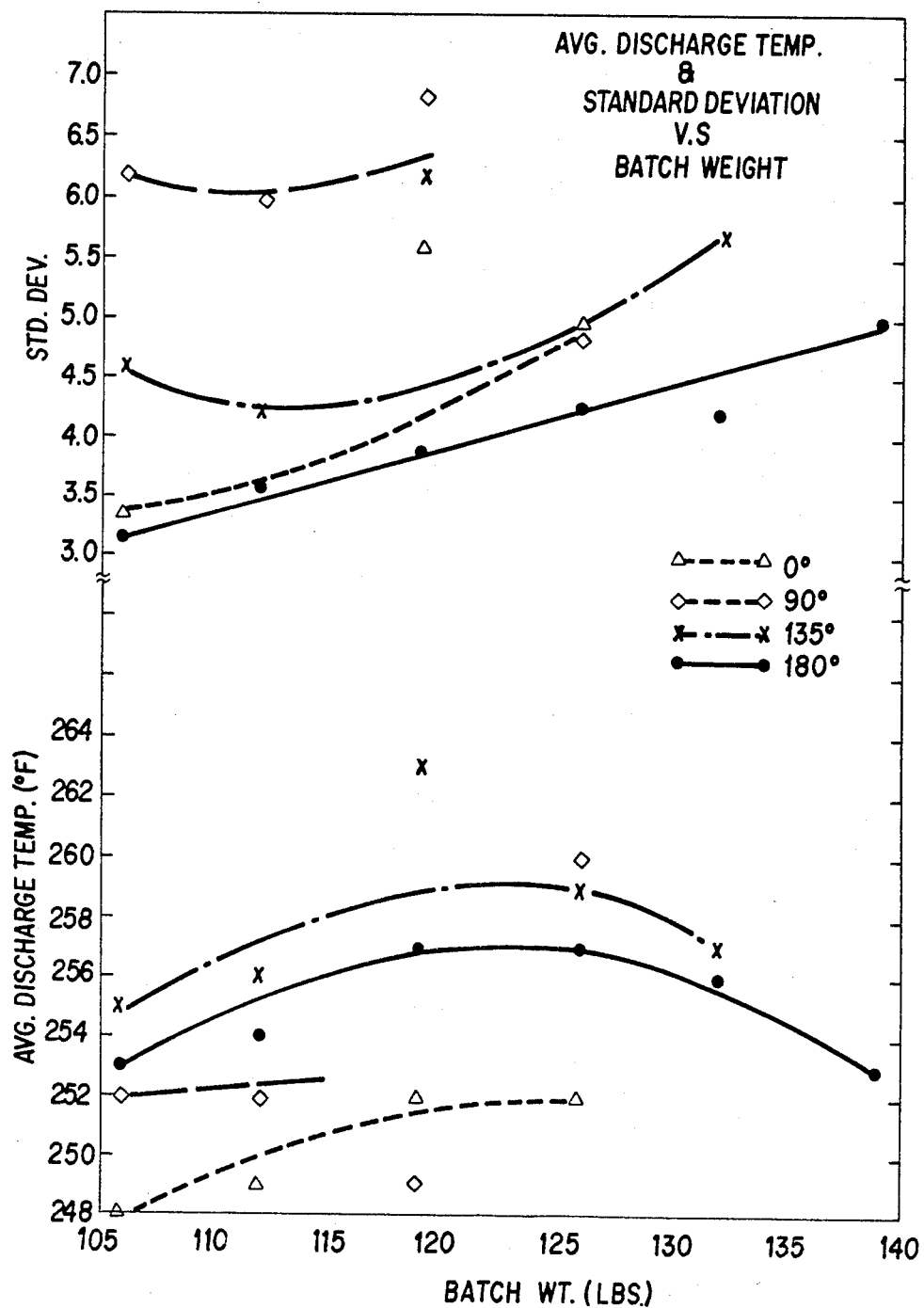

FIG. 14 shows plots of Average Discharge Temperature of a batch and Standard Deviation for these four phase angle relationships as a function of batch weight.

Figure 15:
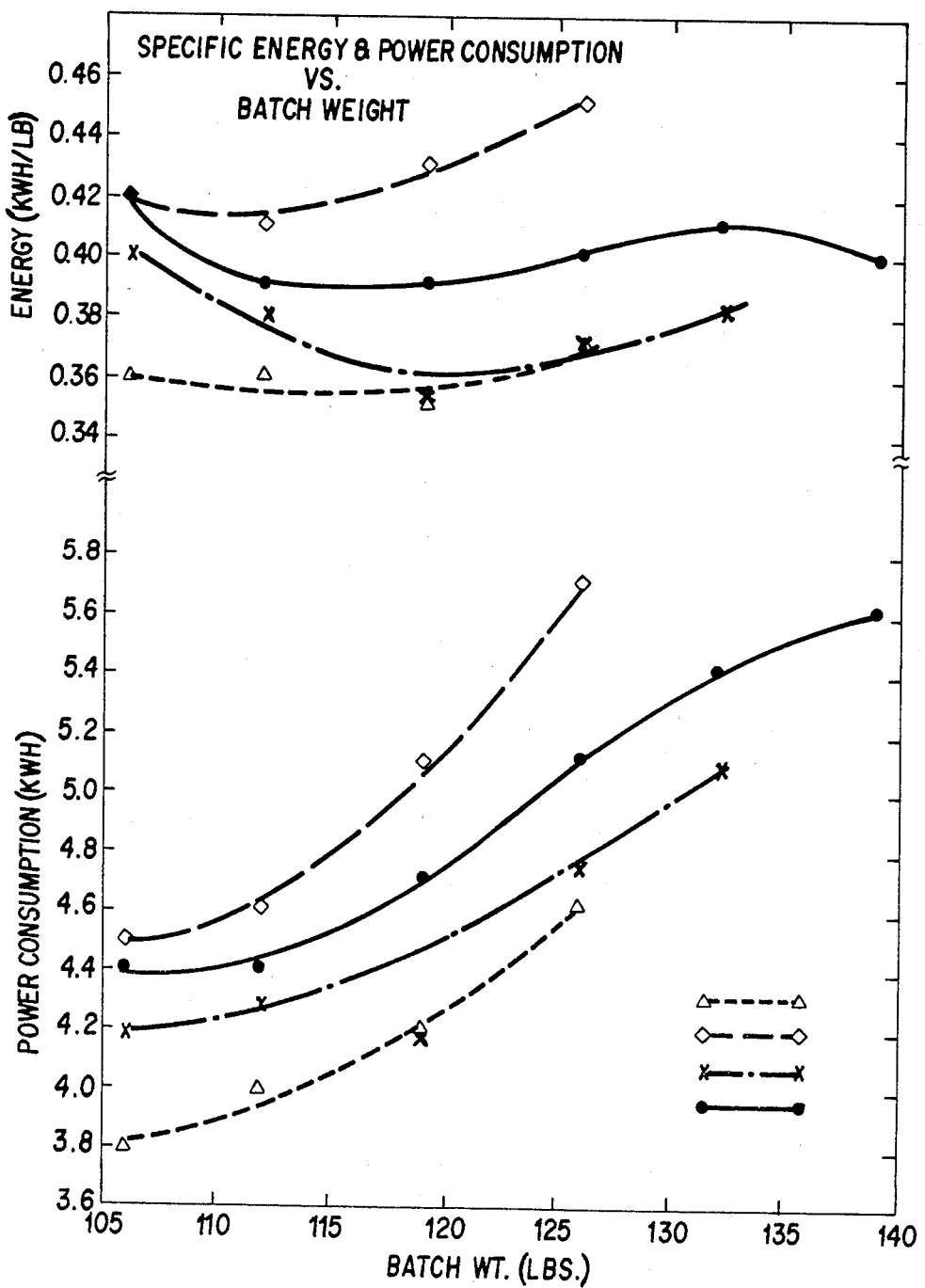

FIG. 15 presents plots of Specific Energy in Kilowatt Hours per Pound and total Power Consumption in KWHs for these four different phase angles as a function of batch weight.

When these novel rotors 81 and 82 are installed in a machine 20, there is slightly less available volume remaining in the mixing chamber 26, but they are so much more effective than prior two-wing rotors that a batch of more material can actually be introduced and mixed in the chamber 26. In other words, a higher "fill factor" is available. The productivity is increased by virtue of this higher fill factor and by virtue of the fact that far fewer rejected mixes are produced.

The advantages of these new rotors 81 and 82, as compared with the prior rotors 51 and 52, are as follows:

| New Rotors 81 and 82, FIGS. 5 and 6 | Prior Rotors 51 and 52, FIGS. 3 and 4 |
|---|---|
| 1. The axial mixing action or flow of the rolling bank of material is randomized due to the difference in the helix angles of the two long wings. This mixing action will assure uniformity in the mix. | The axial mixing action is not randomized due to the fact that the two long wings have the same helix angles. |
| 2. The dwell (residence time) "DL" (FIG. 8B) is increased to force more material into the chamber cavities 27 and 28 to be mixed by shearing action (FIGS. 8A and 8B). | The dwell "DL" being relatively small (FIG. 8A) allows more material to be sitting stagnant at the center 29. This material at the center of the mixer experiences poor heat transfer and less mixing. |
| 3. Feeding of material downward through the chute 32 into the mixing chamber 26 is enhanced because the center of interaction between the rotors is without wings twice in each revolution (FIGS. 9B-2 and 9D-2). | Feeding of material cannot be enhanced because the center of interaction of the rotors varies (FIGS. 10A-2, 10B-2 and 10C-2). |
| 4. The squeeze-flow type of mixing (FIGS. 7B and 7D; 7B-2 and 7D-2; 9A-2 and 9C-2) occurs twice in each revolution of the rotors at the center 29 of the mixer. This type of mixing enhances the transverse distributive mixing which causes the mix to be more homogeneous. | The squeeze-flow type of mixing cannot occur twice in each revolution of the rotors at the center of the mixer. This condition causes a poor mixing at the center of the mixer (FIGS. 10A-2, 10B-2, 10D-2). |
| 5. Equal or uniform "pull-down" of the material occurs twice diagonally in each revolution. This pull-down improvement will enhance the quality of the mix and thereby minimize the number of rejected mixes. Also, consistency in the quality of the mix from batch to batch can be achieved and reliably expected. | Equal or uniform "pull-down" of the material cannot be achieved. Therefore, consistency in the quality of the mix from batch to batch cannot be achieved. |

While preferred embodiments of this invention have been described in detail, it will be understood that various modifications and alterations of these two-wing rotors may be made without departing from the spirit and scope of the invention, as set forth in the appended claims.

What is claimed is:

1. For use in an internal mixing machine of the batch type, including housing means defining a mixing chamber shaped to accommodate two counter-rotating non-intermeshing winged rotors on parallel horizontal axes in said mixing chamber, said housing means having a closable inlet for introducing materials into the mixing chamber and a closable outlet for discharging the mixed materials from said mixing chamber, a pair of improved non-intermeshing two-wing rotors comprising:

first and second non-intermeshing rotors each having first and second wings, each wing having a wing tip of generally helical configuration, said rotors having a ratio between their axial length L and their major diameter D in the range of 1.4 to 2.1, said first wing on each rotor having its wing tip originating at a first end of the rotor at a zero angular position with respect to the rotor axis and having its wing tip oriented at a first helix angle $A_1$ in the range from 25° to 40°, said second wing on each rotor having its wing tip originating at a second end of the rotor at an angular position with respect to the rotor axis in the range from 176° to 184° and having its wing tip oriented at a second helix angle $A_2$ in the range from 35° to 55°, said wing tip of said first wing having a twist angle $T_1$ in the range from 80° to 110°, said wing tip of said second wing having a twist $T_2$ in the range from 90° to 120°, said second helix angle $A_2$ being larger than said first helix angle $A_1$ in the range from 5° to 15°, and said first and second rotors being adapted to be installed in such mixing chamber with the first end of the first rotor at the same end of said mixing chamber as the second end of the second rotor.

2. For use in an internal mixing machine of the batch type, a pair of improved non-intermeshing two-wing rotors as claimed in claim 1, in which:

the wing tip of said first wing on each rotor has a helix angle $A_1$ to about 39°, the wing tip of said second wing on each rotor has a helix angle $A_2$ to about 46°, and said rotors having a ratio between their axial length L and their major diameter D of about 1.58.

3. For use in an internal mixing machine of the batch type, a pair of improved non-intermeshing two-wing rotors as claimed in claim 1, in which:
the wing tip of said first wing on each rotor has a twist angle $T_1$ of about 106°, and
the wing tip of said second wing on each rotor has a twist angle $T_2$ of about 120°.

4. For use in an internal mixing machine of the batch type, a pair of improved non-intermeshing two-wing rotors as claimed in claim 3, in which:
the helix angle $A_2$ of the wing tip of said second wing is about 7° greater than the helix angle $A_1$ of the wing tip of said first wing.

5. For use in an internal mixing machine of the batch type, a pair of improved non-intermeshing two-wing rotors as claimed in claim 4, in which:
the helix angle $A_1$ is about 39°, and
the helix angle $A_2$ is about 46°.

6. In an internal mixing machine of the batch type for mixing polymeric materials, plastic materials, rubber materials, and the like including housing means defining a mixing chamber shaped to accommodate two counter-rotating non-intermeshing winged rotors on parallel horizontal axes in said mixing chamber, drive means for turning said two rotors, said housing means having a closable inlet for introducing materials into the mixing chamber and a closable outlet for discharging the mixed materials from said mixing chamber, the improvement comprising:
first and second non-intermeshing rotors each having first and second wings, each wing having a wing tip of generally helical configuration,
said first wing on each rotor having its wing tip originating at a first end of the rotor at a zero angular position with respect to the rotor axis and having its wing tip oriented at a first helix angle $A_1$ in the range from 25° to 40°,
said second wing on each rotor having its wing tip originating at a second end of the rotor at an angular position with respect to the rotor axis in the range from 176° to 184° and having its wing tip oriented at a second helix angle $A_2$ in the range from 35° to 55°,
said wing tip of said first wing having a twist angle $T_1$ in the range from 80° to 110°,
said wing tip of said second wing having a twist $T_2$ in the range from 90° to 120°,
said second helix angle $A_2$ being larger than said first helix angle $A_1$ in the range from 5° to 15°,
said first and second rotors being installed in such mixing chamber with the first end of the first rotor at the same end of said mixing chamber as the second end of the second rotor,
the phase angle relationship between said rotors being about 180°, and
said drive means being arranged for turning said rotors at synchronized speed,
whereby squeeze-flow mixing action and pull-down on the materials being mixed are produced twice during each cycle of rotation.

7. In an internal mixing machine of the batch type for mixing polymeric materials, plastic materials, rubber materials, and the like, the improvement as claimed in claim 6, in which:
the wing tip of said first wing on each rotor has a helix angle $A_1$ of about 39°, and
the wing tip of said second wing on each rotor has a helix angle $A_2$ of about 46°.

8. In an internal mixing machine of the batch type for mixing polymeric materials, plastic materials, rubber materials, and the like, the improvement as claimed in claim 6, in which:
the wing tip of said first wing on each rotor has a twist angle $T_1$ of about 106°, and
the wing tip of said second wing on each rotor has a twist angle $T_2$ of about 120°.

9. In an internal mixing machine of the batch type for mixing polymeric materials, plastic materials, rubber materials, and the like, the improvement as claimed in claim 8, in which:
the helix angle $A_2$ of the wing tip of said second wing is about 7° greater than the helix angle $A_1$ of the wing tip of said first wing.

10. In an internal mixing machine of the batch type for mixing polymeric materials, plastic materials, rubber materials, and the like, the improvement as claimed in claim 9, in which:
the helix angle $A_1$ is about 39°, and
the helix angle $A_2$ is about 46°.

11. The method of operating an internal mixing machine of the batch type for mixing polymeric materials, plastic materials, rubber materials, and the like, such machine including housing means defining a mixing chamber shaped to accommodate two counter-rotating non-intermeshing winged rotors on parallel horizontal axes in said mixing chamber with drive means for turning said two rotors in counter-rotating relationship, said housing means having a closable inlet for introducing materials into the mixing chamber and a closable outlet for discharging the mixed materials from said mixing chamber, said method comprising the steps of:
providing first and second non-intermeshing rotors each having first and second wings, each wing having a wing tip of generally helical configuration, said first wing on each rotor having its wing tip originating at a first end of the rotor at a zero angular position with respect to the rotor axis and having its wing tip oriented at a first helix angle $A_1$ in the range from 25° to 40°, said second wing on each rotor having its wing tip originating at a second end of the rotor at an angular position with respect to the rotor axis in the range from 176° to 184° and having its wing tip oriented at a second helix angle $A_2$ in the range from 35° to 55°, said wing tip of said first wing having a twist angle $T_1$ in the range from 80° to 110°, said wing tip of second wing having a twist angle $T_2$ in the range from 90° to 120°, said second helix angle $A_2$ being larger than said first helix angle $A_1$ in the range from 5° to 15°,
installing said first and second rotors in such mixing chamber with the first end of the first rotor at the same end of said mixing chamber as the second end of the second rotor,
orienting said first and second rotors in such mixing chamber at a phase angle relationship of about 180°, and
arranging said drive means for counter rotating said rotors at synchronized speed,
whereby squeeze-flow mixing action and pull-down on the materials being mixed are produced twice during each cycle of rotation.

* * * * *